United States Patent
Muraoka et al.

(10) Patent No.: US 11,420,682 B2
(45) Date of Patent: Aug. 23, 2022

(54) VEHICLE-BODY STRUCTURE OF VEHICLE

(71) Applicant: MAZDA MOTOR CORPORATION, Hiroshima (JP)

(72) Inventors: Shuji Muraoka, Aki-gun (JP); Yusuke Desaki, Aki-gun (JP); Tsuneaki Zenitani, Aki-gun (JP); Satoshi Nakamura, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 35 days.

(21) Appl. No.: 17/088,697

(22) Filed: Nov. 4, 2020

(65) Prior Publication Data

US 2021/0147003 A1 May 20, 2021

(30) Foreign Application Priority Data

Nov. 15, 2019 (JP) .............................. JP2019-207013

(51) Int. Cl.
*B62D 25/04* (2006.01)
*B62D 27/02* (2006.01)
*B62D 21/15* (2006.01)

(52) U.S. Cl.
CPC ........... *B62D 25/04* (2013.01); *B62D 21/152* (2013.01); *B62D 27/02* (2013.01); *B62D 27/023* (2013.01)

(58) Field of Classification Search
CPC ........ B62D 25/04; B62D 25/08; B62D 21/15; B62D 21/152; B62D 27/023
USPC .............. 296/193.06, 187.09, 187.1, 203.01, 296/203.02, 29, 30
See application file for complete search history.

(56) References Cited

U.S. PATENT DOCUMENTS

2017/0313358 A1  11/2017  Narahara et al.

FOREIGN PATENT DOCUMENTS

| EP | 2 281 732 A1 | 2/2011 |
| JP | 2007-076603 A | 3/2007 |
| JP | 2017197058 A | 11/2017 |
| JP | 2019-034601 A | 3/2019 |

OTHER PUBLICATIONS

The extended European search report issued by the European Patent Office dated Mar. 24, 2021, which corresponds to European Patent Application No. 20207171.8-1009 and is related to U.S. Appl. No. 17/088,697.

*Primary Examiner* — Dennis H Pedder
(74) *Attorney, Agent, or Firm* — Studebaker & Brackett PC

(57) ABSTRACT

In a vehicle having a large side door opening, a vehicle-body structure suppresses, during a collision in which an apron reinforcement recedes, bending deformation of a hinge pillar at a mounting portion of the apron reinforcement. Embodiments include a reinforcement member inside a closed cross-section of a hinge pillar overlapping a mounting portion of an apron reinforcement in the up-down direction. The reinforcement member includes a body extending in the up-down direction spaced apart from the hinge pillar, a front flange portion at a front portion of the body, a lateral flange portion at a rear portion of the body, a front ridge portion between the body and the front flange portion, and a rear ridge portion between the body and the lateral flange portion. Each of the front ridge portion and the rear ridge portion is continuously provided over the reinforcement member in the vehicle up-down direction.

18 Claims, 12 Drawing Sheets

US 11,420,682 B2

VEHICLE-BODY STRUCTURE OF VEHICLE

TECHNICAL FIELD

The present disclosure relates to a vehicle-body structure of a vehicle which includes a pair of left and right apron reinforcements extending in the front-rear direction of the vehicle, on the vehicle-width-direction outer side and the upper side with respect to a pair of left and right front side frames extending in the front-rear direction of the vehicle, and a pair of left and right hinge pillars each of which has a closed cross-section extending in the vehicle up-down direction and on which rear ends of the apron reinforcements are mounted.

BACKGROUND ART

A conventional vehicle-body structure of a vehicle in the above-described example is disclosed in Japanese Patent Laid-Open No. 2017-197058, wherein a structure including, between a side sill extending in the vehicle front-rear direction and a roof side rail continuous with a rear portion of a front pillar, a center pillar constraining these in the vehicle up-down direction is provided with a hinge pillar with a closed cross-section structure connecting a front portion of the side sill and an inclined lower end portion of the front pillar in the vehicle up-down direction. Inside the hinge pillar, a reinforcement member is provided which extends in the up-down direction of the hinge pillar and has an L-shaped cross section as viewed in plan.

In a vehicle whose side door opening area is large, such as one including a side door with a clamshell door structure with no center pillar or a slide door, a hinge pillar is bent and deformed when, as in a small overlap collision, a collision load in which an apron reinforcement recedes is input. Thereby, a front pillar has opening deformation with respect to a side sill; that is, a rear portion of the front pillar is deformed toward the vehicle upper side together with a front portion of a roof side rail.

If the front pillar and the hinge pillar are sufficiently reinforced without regarding vehicle-body weight as a problem, bending deformation of the above-described hinge pillar can be suppressed. However, in this case, a disadvantageous increase in weight is caused. Thus, there has been recently a demand for suppressing bending deformation of the hinge pillar without an increase in vehicle-body weight.

Although as disclosed in Japanese Patent Laid-Open No. 2017-197058, a reinforcement member has been conventionally provided inside the hinge pillar, in a vehicle whose side door opening area is large, a reinforcement with even higher strength is essential.

SUMMARY

Thus, the present disclosure provides, in a vehicle whose side door opening is large, a vehicle-body structure of the vehicle which can suppress, at the time of a collision in which an apron reinforcement recedes, bending deformation of a hinge pillar at a mounting portion of the apron reinforcement.

A vehicle-body structure of a vehicle according to the present disclosure is a vehicle-body structure of a vehicle including a pair of left and right apron reinforcements extending in a front-rear direction of the vehicle so as to be located on a vehicle-width-direction outer side and an upper side with respect to a pair of left and right front side frames extending in the front-rear direction of the vehicle, and a pair of left and right hinge pillars each of which has a closed cross-section extending in a vehicle up-down direction and on which rear ends of the apron reinforcements are mounted. The vehicle-body structure includes a reinforcement member inside the closed cross-section of each hinge pillar, the reinforcement member being provided at a position overlapping with a mounting portion of the respective apron reinforcement in the vehicle up-down direction. The reinforcement member includes a body extending in the vehicle up-down direction so as to be spaced apart from the hinge pillar, a front flange portion mounted on a front face of the hinge pillar so as to be located at a front portion of the body, a lateral flange portion mounted on a vehicle-width-direction outer-side face of the hinge pillar so as to be located at a rear portion of the body, a front ridge portion located between the body and the front flange portion, and a rear ridge portion located between the body and the lateral flange portion. Each of the front ridge portion and the rear ridge portion is continuously provided over the reinforcement member in the vehicle up-down direction.

According to such a configuration, the reinforcement member is provided at a position overlapping with the mounting portion of the apron reinforcement in the vehicle up-down direction, and this reinforcement member is provided with the front ridge portion and the rear ridge portion which are continuous in the vehicle up-down direction without a break, improving rigidity of the reinforcement member at these front and rear ridge portions.

Thereby, rigidity in the front-rear direction of the hinge pillar overlapping with the mounting portion of the apron reinforcement can be improved.

Accordingly, when a load from the apron reinforcement to the rear direction is input, bending deformation of the hinge pillar in which the mounting portion of the apron reinforcement serves as a starting point can be suppressed.

Furthermore, each of the front and rear ridge portions is continuous in the vehicle up-down direction without a break, and thus proof stress with respect to compression and tension in the vehicle up-down direction of the reinforcement member is improved, so that the bending deformation of the hinge pillar can be further suppressed.

In an embodiment of the present disclosure, the front flange portion is joined and fixed to the front face of the hinge pillar, the lateral flange portion is joined and fixed to the vehicle-width-direction outer-side face of the hinge pillar, and between the hinge pillar and the reinforcement member, a second closed cross-section extending in the vehicle up-down direction is formed. According to such a configuration, by forming the second closed cross-section, the bending deformation of the hinge pillar can be suppressed more effectively.

In an embodiment of the present disclosure, at a position corresponding to the mounting portion of the apron reinforcement, inside the hinge pillar, a gusset member having partition faces partitioning the closed cross-section of the hinge pillar on an upper side and a lower side is provided, and the reinforcement member is provided so as to overlap with the gusset member in the up-down direction. According to such a configuration, a rigidity difference of the hinge pillar in the vicinity of the mounting portion of the apron reinforcement can be reduced, and the bending deformation of the hinge pillar can be further suppressed.

In an embodiment of the present disclosure, the body has a hole at a position facing to the mounting portion of the apron reinforcement. According to such a configuration, while the apron reinforcement and the hinge pillar can be joined and fixed to each other via the above-described hole, each of the front and rear ridge portions of the reinforcement member can be continuous in the vehicle up-down direction, and further, the reinforcement member can be reduced in weight by the hole.

In an embodiment of the present disclosure, the body includes a plurality of beads connecting the front flange portion and the lateral flange portion and spaced apart from each other in the vehicle up-down direction. According to such a configuration, at the time of receding of the apron reinforcement, the plurality of beads can function as bracing portions, and proof stress of the hinge pillar with respect to input of a collision load can be improved.

In an embodiment of the present disclosure, of the plurality of beads, at least one bead connects a joined portion with respect to the hinge pillar of the front flange portion and a joined portion with respect to the hinge pillar of the lateral flange portion. According to such a configuration, a load input to the hinge pillar can be effectively transferred to a lateral portion of the hinge pillar to which the lateral flange portion is joined, via the front flange portion of the reinforcement member, the bead of the body, and the lateral flange portion, and the bending deformation of the hinge pillar can be further suppressed.

According to the present disclosure, an effect is provided which can suppress, in a vehicle whose side door opening is large, at the time of a collision in which the apron reinforcement recedes, the bending deformation of the hinge pillar at the mounting portion of the apron reinforcement.

DETAILED DESCRIPTION

In a vehicle whose side door opening is large, suppressing, at the time of a collision in which an apron reinforcement recedes, bending deformation of a hinge pillar at a mounting portion of the apron reinforcement is achieved by a configuration of a vehicle-body structure of the vehicle which includes a pair of left and right apron reinforcements extending in the front-rear direction of the vehicle so as to be located on the vehicle-width-direction outer side and the upper side with respect to a pair of left and right front side frames extending in the front-rear direction of the vehicle, and a pair of left and right hinge pillars each of which has a closed cross-section extending in the vehicle up-down direction and on which rear ends of the apron reinforcements are mounted, in which the vehicle-body structure includes a reinforcement member inside the closed cross-section of the hinge pillar which is provided at a position overlapping with a mounting portion of the apron reinforcement in the vehicle up-down direction. The reinforcement member includes a body extending in the vehicle up-down direction so as to be spaced apart from the hinge pillar, a front flange portion mounted on a front face of the hinge pillar so as to be located at a front portion of the body, a lateral flange portion mounted on a vehicle-width-direction outer-side face of the hinge pillar so as to be located at a rear portion of the body, a front ridge portion located between the body and the front flange portion, and a rear ridge portion located between the body and the lateral flange portion. Each of the front ridge portion and the rear ridge portion is continuously provided over the reinforcement member in the vehicle up-down direction.

An embodiment of the present disclosure will be described in detail based on the accompanying drawings. The drawings show a vehicle-body structure of a vehicle, in which FIG. 1 is an outer side view on the vehicle right side which shows the vehicle-body structure of the vehicle, FIG. 2 is an inner side view on the vehicle right side which shows the vehicle-body structure of the vehicle, and FIG. 3 is an enlarged side view showing a main portion where a hinge pillar inner is removed from FIG. 2.

Figure 3:
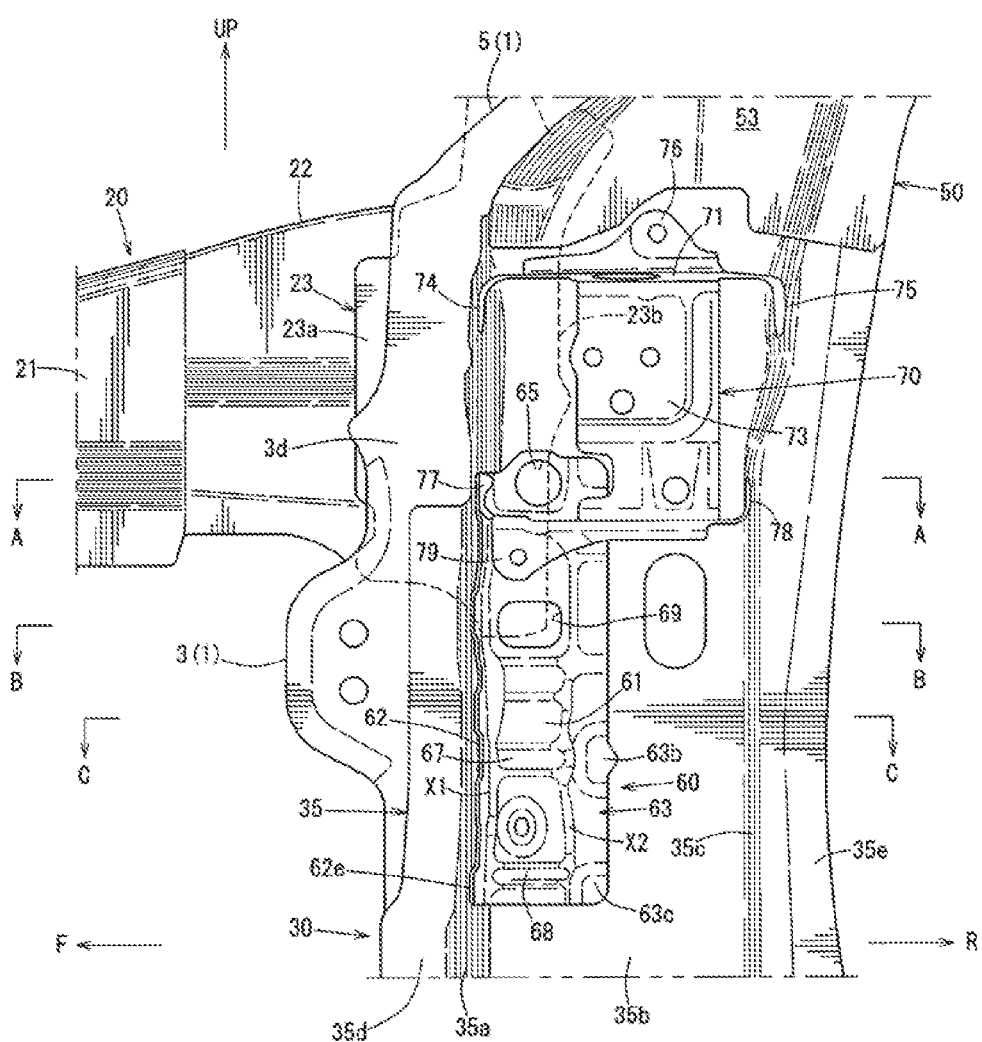
FIG. 3 is an enlarged side view showing a main portion where a hinge pillar inner is removed from FIG. 2.
Figure 4:
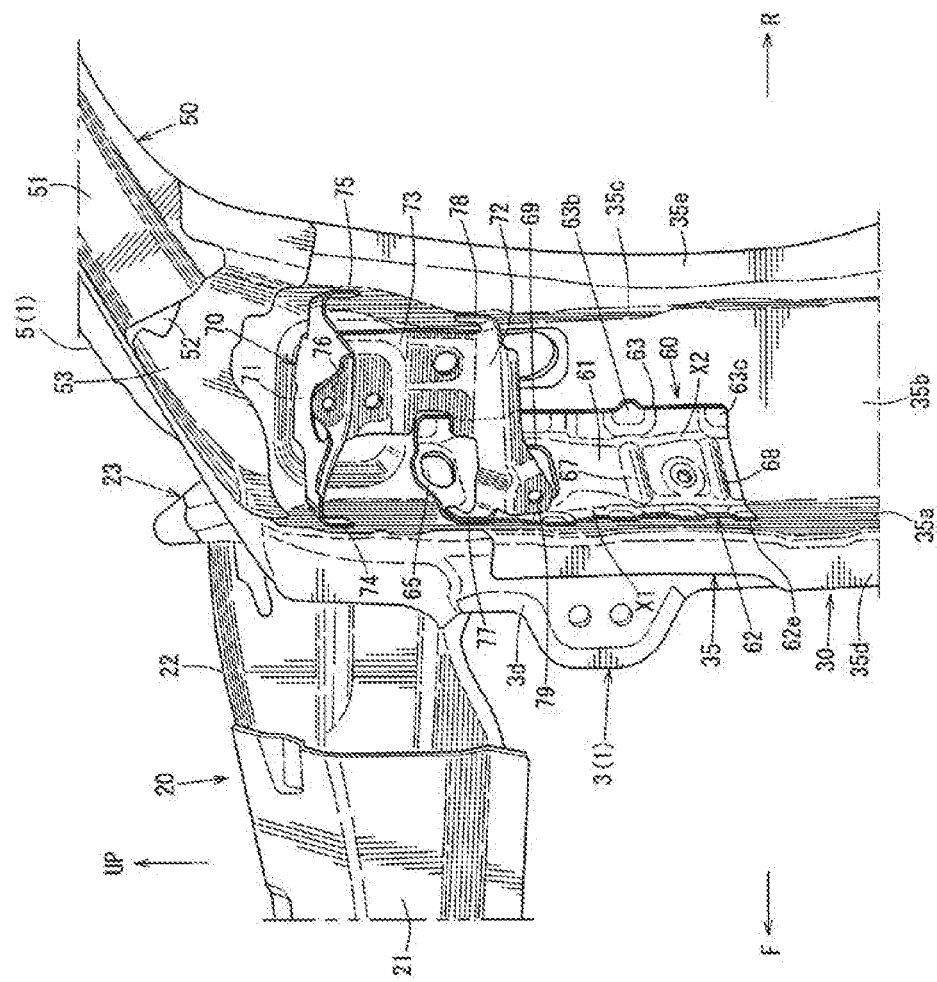
FIG. 4 is a perspective view showing the vehicle-body structure in FIG. 3 viewed from the rear side on the vehicle-width-direction inner side.
Figure 5:
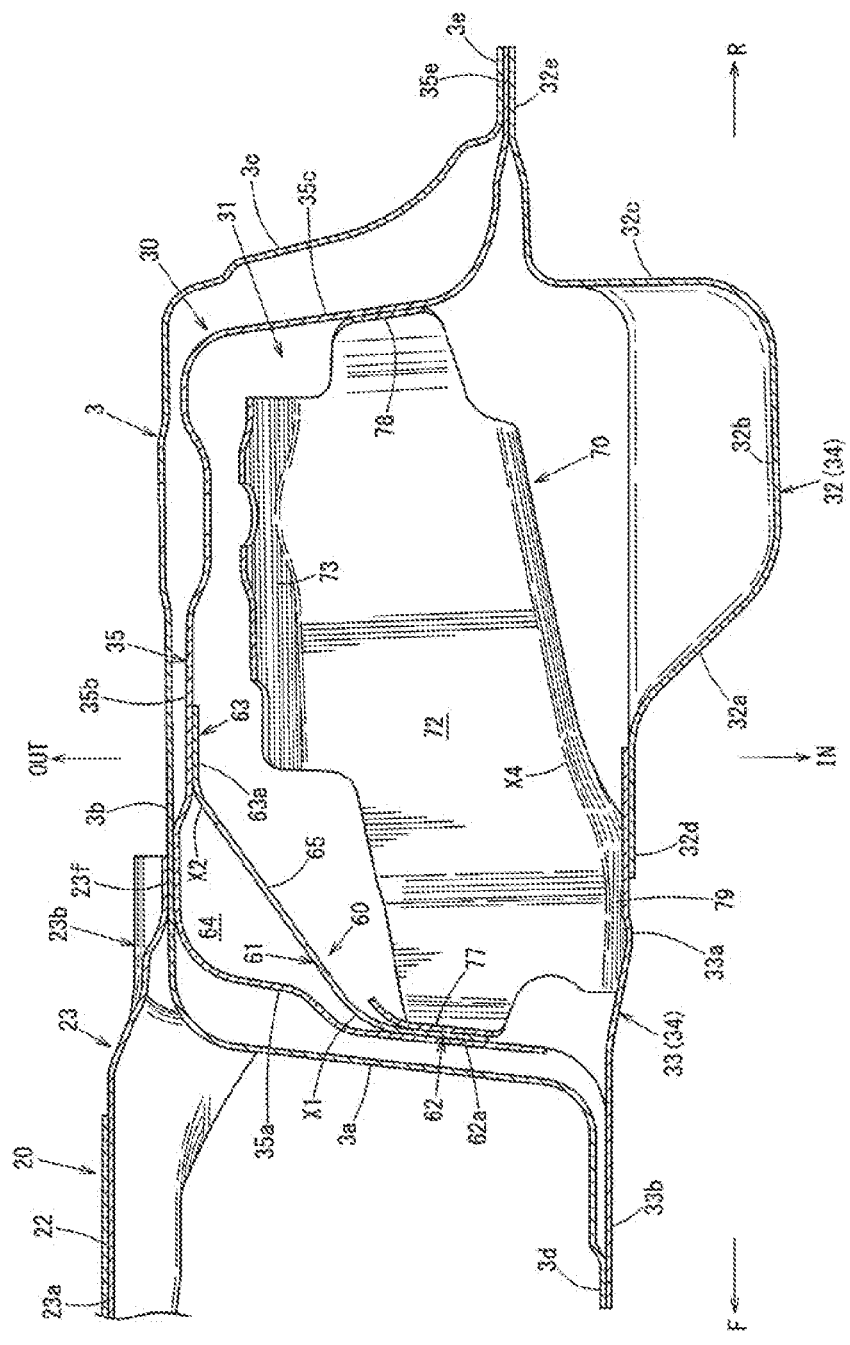
FIG. 5 is a cross-sectional view taken along line A-A in FIG. 3.
Figure 6:
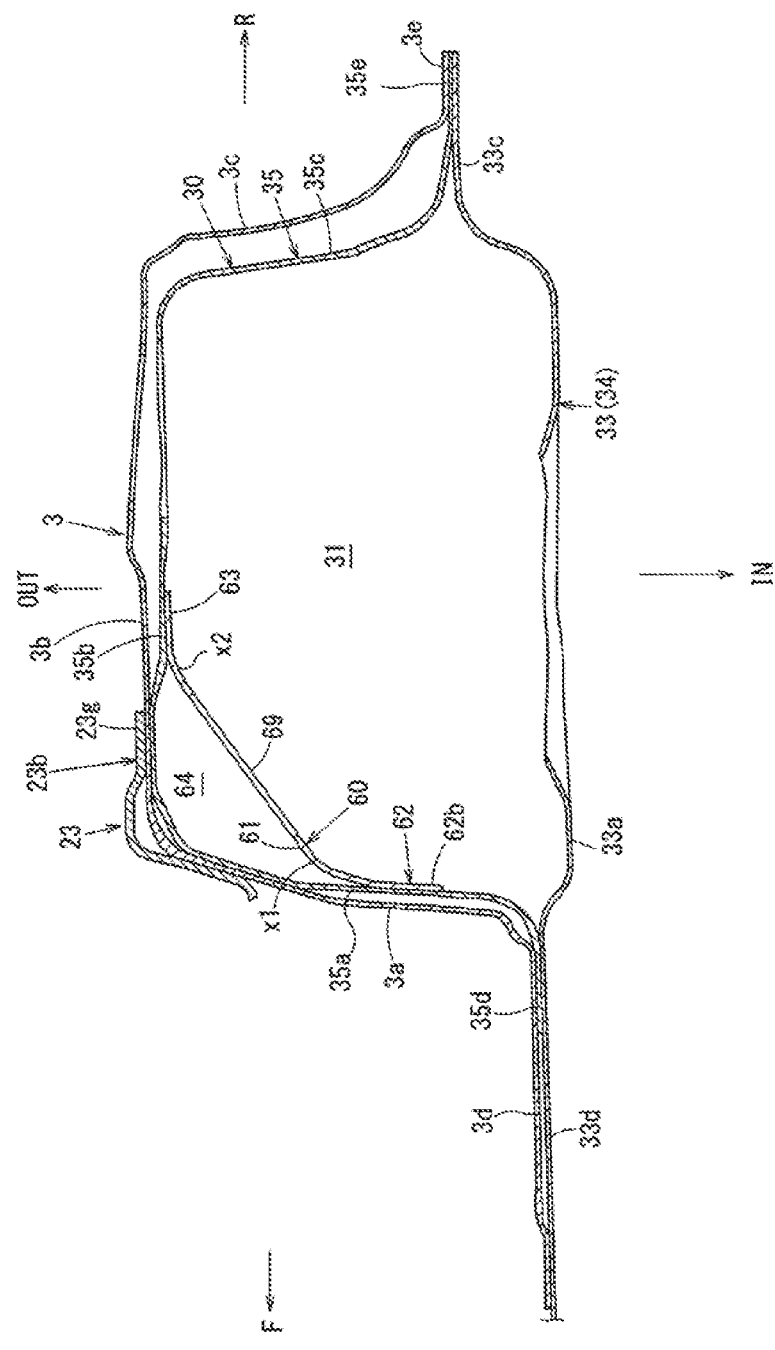
FIG. 6 is a cross-sectional view taken along line B-B in FIG. 3.
Figure 7:
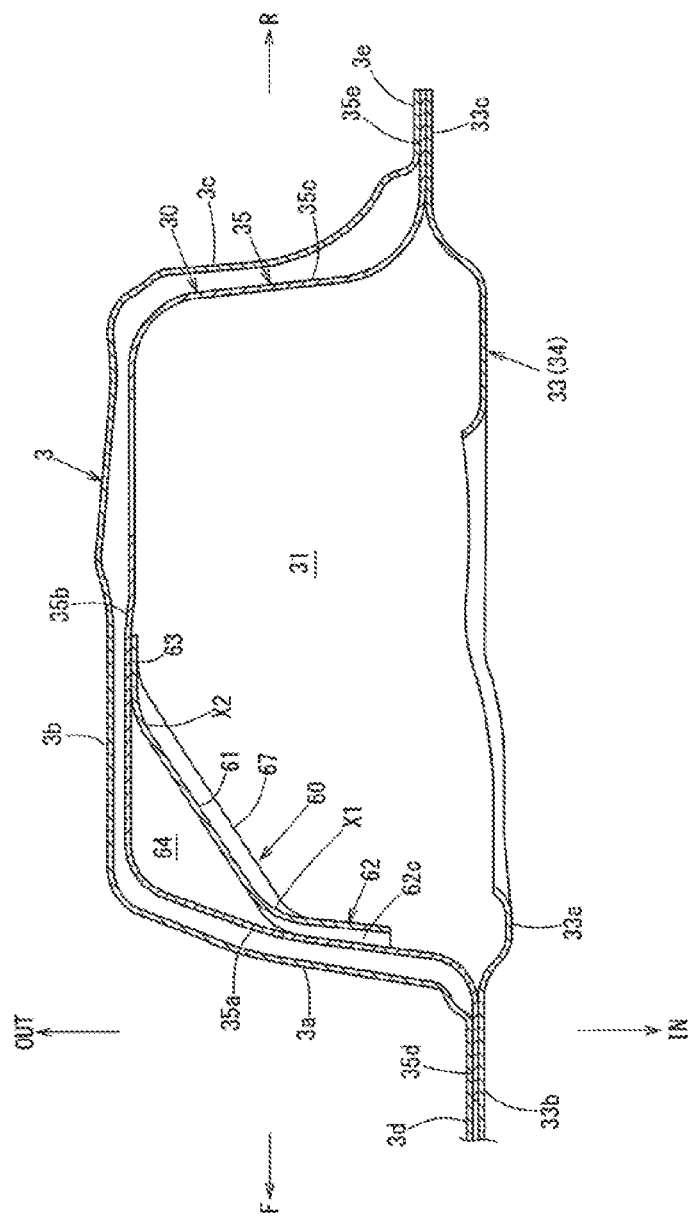
FIG. 7 is a cross-sectional view taken along line C-C in FIG. 3.

Further, FIG. 4 is a perspective view showing the vehicle-body structure in FIG. 3 as viewed from the rear side on the vehicle-width-direction inner side, FIG. 5 is a cross-sectional view taken along line A-A in FIG. 3, FIG. 6 is a cross-sectional view taken along line B-B in FIG. 3, and FIG. 7 is a cross-sectional view taken along line C-C in FIG. 3. The vehicle-body structure of the vehicle in this embodiment is left-right symmetrical or substantially left-right symmetrical, and thus the structure on the vehicle right side will be explained in the following embodiment.

Figure 1:
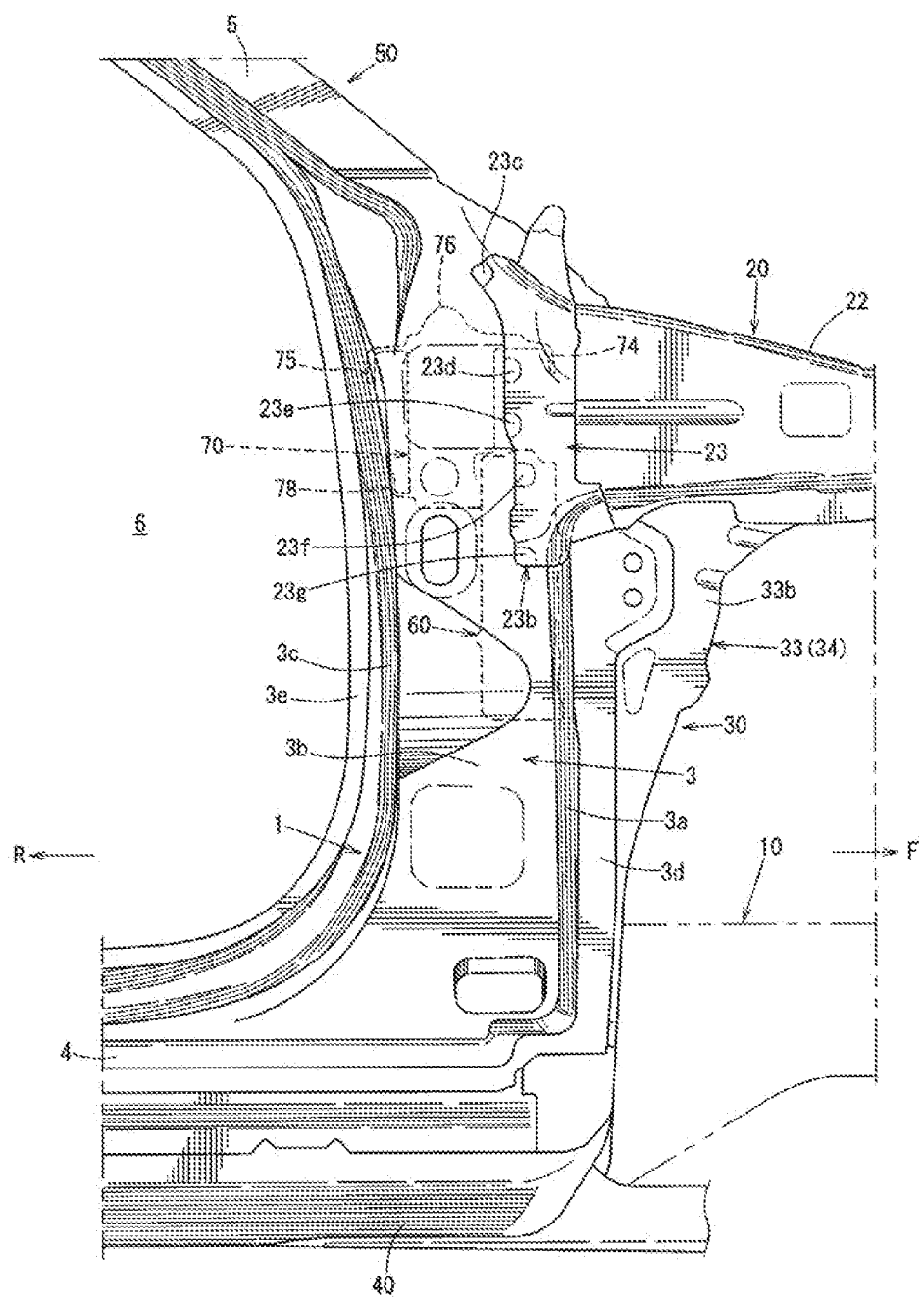
FIG. 1 is an outer side view on the vehicle right side which shows a vehicle-body structure of a vehicle of the present disclosure.
Figure 2:
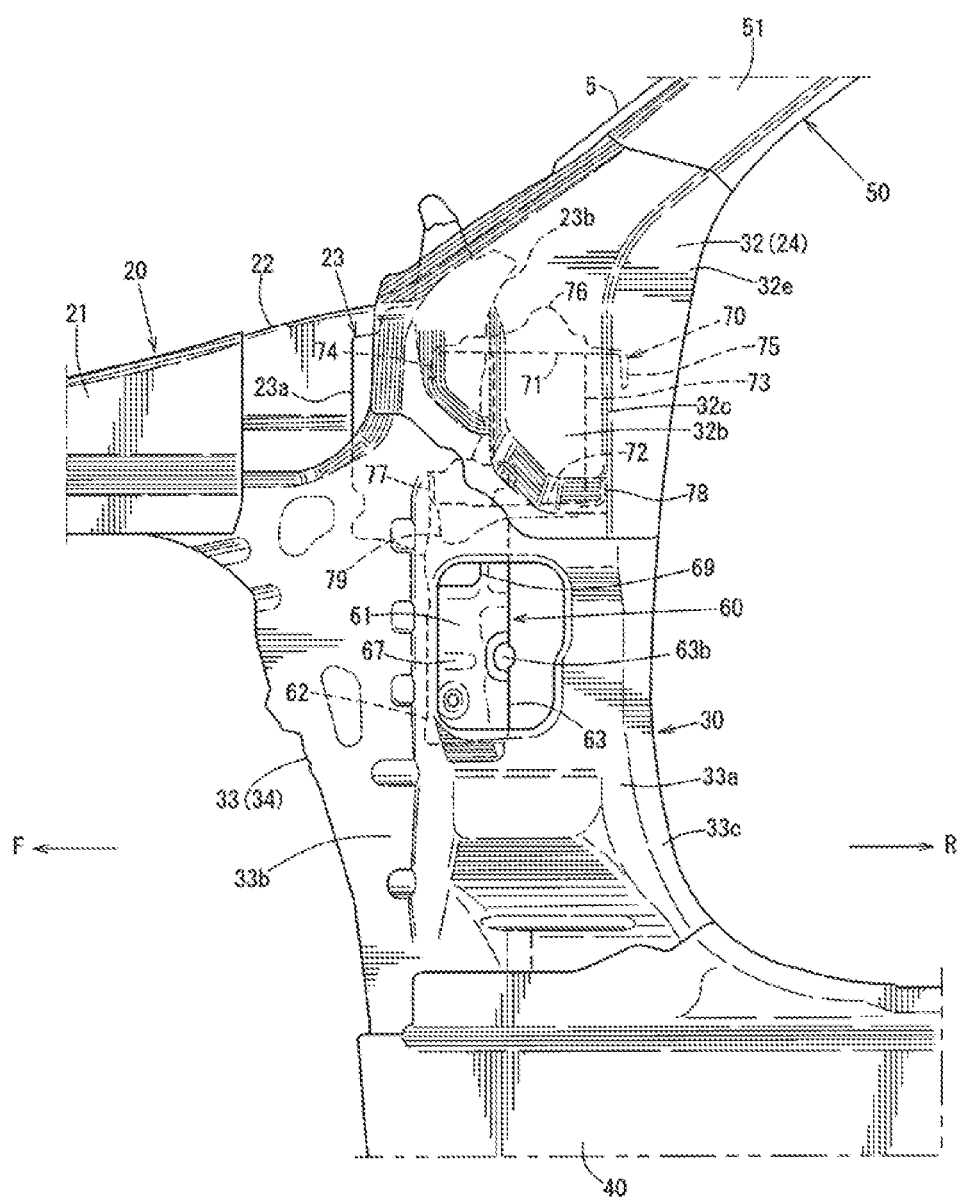
FIG. 2 is an inner side view on the vehicle right side which shows the vehicle-body structure of the vehicle.

As shown in FIG. 1, there is provided a pair of left and right front side frames 10 extending toward the vehicle front side from a dash lower panel (illustration omitted) partitioning an engine compartment (a motor compartment in the case of an electric vehicle) and a vehicle cabin in the vehicle front-rear direction. Note that in the drawing, only a rear portion of the front side frame 10 on the vehicle right side is shown.

This front side frame 10 is a vehicle-body rigidity member extending in the vehicle front-rear direction on each of both left and right sides of the engine compartment, and the front side frame 10 has a front side closed cross-section extending in the vehicle front-rear direction, in which a front side frame inner and a front side frame outer that are joined together.

As shown in FIG. 1, there is provided a pair of left and right apron reinforcements 20 extending in the front-rear direction of the vehicle so as to be located on the vehicle-width-direction outer side and the vehicle upper side with respect to the above-described front side frames 10. Note that in the drawing, only the apron reinforcement 20 on the vehicle right side is shown.

As shown in FIGS. 1 to 4, the above-described apron reinforcement 20 is a vehicle-body rigidity member having an apron reinforcement closed cross-section extending in the vehicle front-rear direction, in which an apron reinforcement inner 21 and an apron reinforcement outer 22 are joined together. Furthermore, at a rear end portion of the apron reinforcement outer 22 at the above-described apron reinforcement 20, a cowl side reinforcement 23 is provided which connects the apron reinforcement 20 to a hinge pillar 30, which will be described later.

As shown in FIG. 5, there is provided the pair of left and right hinge pillars 30 each of which has a closed cross-section 31 extending in the vehicle up-down direction and on which rear ends of the apron reinforcements 20 (see the cowl side reinforcement 23) are mounted. Note that in the drawing, only the hinge pillar 30 on the vehicle right side is shown. On the above-described hinge pillar 30, a front door (illustration omitted) as a side door is mounted via a door hinge member.

As shown in FIGS. 2 and 5 to 7, the above-described hinge pillar 30 includes a hinge pillar inner 34 divided into upper and lower two pieces, a hinge pillar inner upper 32 and a hinge pillar inner lower 33, and a hinge pillar outer 35, and is a vehicle-body rigidity member having a closed cross-section 31 extending in the up-down direction of the vehicle. This hinge pillar 30 connects a front end portion of a side sill 40 shown in FIGS. 1 and 2 and an inclined lower end portion of a front pillar 50 shown in FIGS. 2 to 4 so as to extend in the up-down direction. Here, the above-described side sill 40 is a vehicle rigidity member having a side sill closed cross-section extending in the front-rear direction of the vehicle, in which a side sill inner and a side sill outer are joined together.

As shown in FIG. 4, the above-described front pillar 50 includes a front pillar inner 51, a front pillar reinforcement 52, and a front pillar outer 53, and is a vehicle-body rigidity member having a front pillar closed cross-section extending in the longitudinal direction of the front pillar 50. This front pillar 50 connects an upper end portion of the above-described hinge pillar 30 and a front end portion of a roof side rail (illustration omitted) so as to extend in the inclined direction in a front-low rear-high shape in which the front side is low and the rear side is high.

As shown in FIG. 1, the vehicle-width-direction outer sides of the above-described side sill 40, the hinge pillar 30, the front pillar 50, and the roof side rail, which is not illustrated, are integrally covered by a side sill portion 4, hinge pillar portion 3, front pillar portion 5, and roof side rail portion of a side frame outer 1.

As shown in FIG. 1, a side door opening 6 is formed which is surrounded by the side sill 40 extending in the front-rear direction at a vehicle-body lower portion, the hinge pillar 30 extending in the vehicle up-down direction at a vehicle-body front portion, the front pillar 50 extending in the inclined direction, the roof side rail extending in the front-rear direction at a vehicle-body upper portion, and a rear pillar or a quarter pillar at a vehicle-body rear portion. When a center pillar-less vehicle body with no center pillar constraining the above-described side sill 40 and the roof side rail in the vehicle up-down direction is adopted, the side door opening 6 becomes relatively large.

As shown in FIG. 5, the hinge pillar inner upper 32 at the above-described hinge pillar 30 is formed by integrating a front face 32a, an inner-side face 32b in the vehicle width direction, a rear face 32c, a flange portion 32d extending forward from the front face 32a, and a flange portion 32e extending rearward from the rear face 32c.

As shown in FIGS. 5 to 7, the hinge pillar inner lower 33 at the above-described hinge pillar 30 is formed by integrating an inner-side face 33a, a flange portion 33b extending forward so as to be offset outward in the vehicle width direction from a front end of this inner-side face 33a, and a flange portion 33c extending rearward so as to be offset outward in the vehicle width direction from a rear end of the inner-side face 33a.

As shown in FIGS. 5 to 7, the hinge pillar outer 35 at the above-described hinge pillar 30 is formed by integrating a front face 35a, an outer-side face 35b in the vehicle width direction, a rear face 35c, a flange portion 35d extending forward from the front face 35a, and a flange portion 35e extending rearward from the rear face 35c and is configured in a hat-shaped profile in cross section as viewed in plan.

Specifically, the front face 35a extends inward in the vehicle width direction from a front end of the outer-side face 35b, the rear face 35c extends inward in the vehicle width direction from a rear end of the outer-side face 35b, and the outer-side face 35b connects a vehicle-width-direction outer end of the front face 35a and a vehicle-width-direction outer end of the rear face 35c, in the vehicle front-rear direction.

As shown in FIGS. 5 to 7, the above-described hinge pillar portion 3 is formed by integrating a front face 3a, an outer-side face 3b in the vehicle width direction, a rear face 3c, a flange portion 3d extending forward from the front face 3a, and a flange portion 3e extending rearward from the rear face 3c, and is configured in a hat-shaped profile in cross section as viewed in plan.

As shown in FIG. 5, the flange portion 32d on the front side of the hinge pillar inner upper 32 is joined and fixed to the inner-side face 33a of the hinge pillar inner lower 33. Furthermore, the flange portion 32e on the rear side of the hinge pillar inner upper 32 is joined and fixed to the flange portion 35e on the rear side of the hinge pillar outer 35 and the flange portion 3e on the rear side of the hinge pillar portion 3.

As shown in FIGS. 6 and 7, the flange portion 33b on the front side of the hinge pillar inner lower 33 is joined and fixed to the flange portion 35d on the front side of the hinge pillar outer 35 and the flange portion 3d on the front side of the hinge pillar portion 3. Furthermore, the flange portion 33c on the rear side of the hinge pillar inner lower 33 is joined and fixed to the flange portion 35e on the rear side of the hinge pillar outer 35 and the flange portion 3e on the rear side of the hinge pillar portion 3.

As shown in FIGS. 1 and 5, a front portion 23a of the above-described cowl side reinforcement 23 is connected and fixed to an inner face of a rear portion of the apron reinforcement outer 22. Furthermore, a rear portion 23b is connected and fixed to the outer-side face 35b of the hinge pillar outer 35 and the outer-side face 3b of the hinge pillar portion 3. Thereby, the rear end of the above-described apron reinforcement 20 is mounted on the hinge pillar 30.

As shown in FIG. 1, at the rear portion 23b of the above-described cowl side reinforcement 23, a plurality of joined portions 23c, 23d, 23e, 23f, and 23g are formed so as to be spaced apart from each other in the vehicle up-down direction of the rear portion 23b, and each of these joined portions 23c to 23g is joined and fixed to the hinge pillar outer 35.

As shown in FIGS. 3 to 7, inside the closed cross-section 31 of the above-described hinge pillar 30, a reinforcement member 60 is provided at a position overlapping with a mounting portion of the apron reinforcement 20 (see the rear portion 23b of the cowl side reinforcement 23) in the vehicle up-down direction. Specifically, as shown in FIGS. 5, 6, and 7, the above-described reinforcement member 60 is diagonally provided between the front face 35a and outer-side face 35b of the hinge pillar outer 35 at the hinge pillar 30.

As shown in FIGS. 7 to 10, the above-described reinforcement member 60 includes a body 61, a front flange portion 62, a lateral flange portion 63, a front ridge portion X1, and a rear ridge portion X2. As shown in FIGS. 7 to 10, the above-described body 61 extends in the vehicle up-down direction so as to be spaced apart from a vehicle-width-direction outer portion of the front face 35a of the hinge pillar outer 35 and the front side of the outer-side face 35b of the hinge pillar outer 35.

The above-described front flange portion 62 is located at a front portion of the body 61 and is integrally formed so as to be bent toward the vehicle-width-direction inner side from a front end of the body 61. The above-described lateral flange portion 63 is located at a rear portion of the body 61 and is integrally formed so as to be bent toward the vehicle rear side from a rear end of the body 61.

Figure 10:
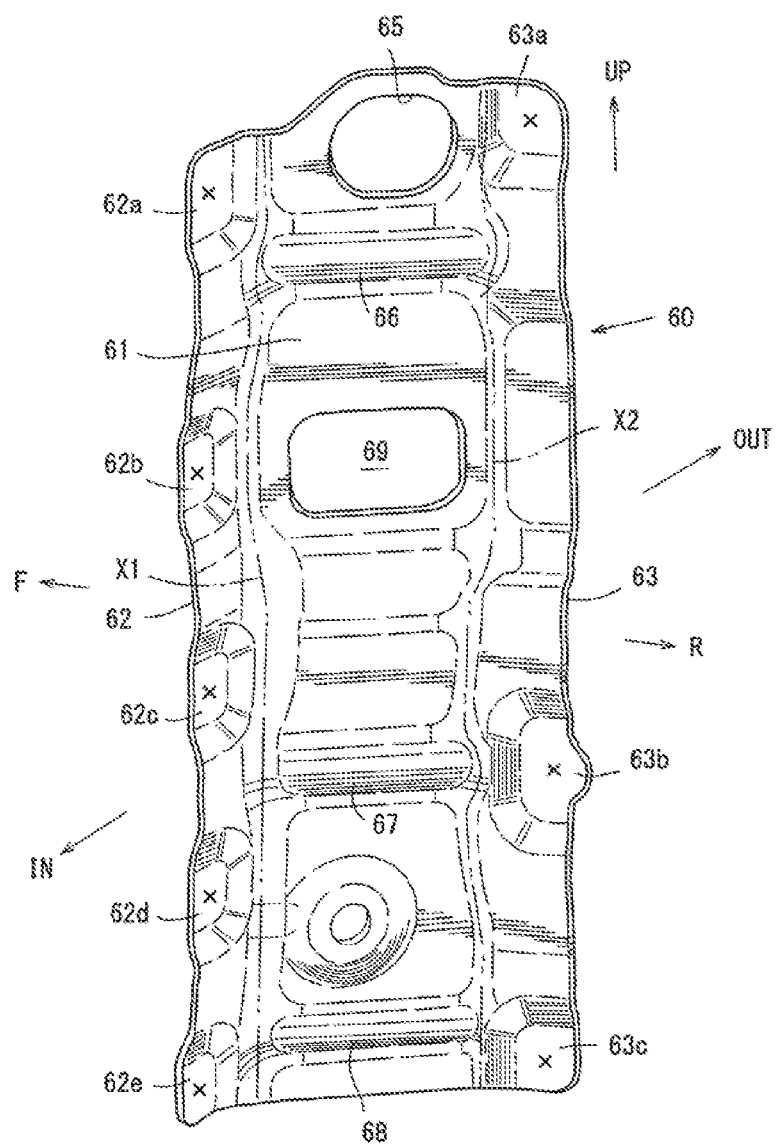
FIG. 10 is a perspective view showing the reinforcement member viewed from the vehicle-width-direction inner side and the vehicle rear side.

The above-described front ridge portion X1 is located between the body 61 and the front flange portion 62, and as shown in FIG. 10, this front ridge portion X1 is continuously provided in the vehicle up-down direction over an entire height of the reinforcement member 60 without a break.

The above-described rear ridge portion X2 is located between the body 61 and the lateral flange portion 63, and as shown in FIG. 10, this rear ridge portion X2 is, similarly to the front ridge portion X1, also continuously provided in the vehicle up-down direction over the entire height of the reinforcement member 60 without a break.

Namely, as shown in FIG. 3, the reinforcement member 60 is provided at the position overlapping with the mounting portion of the apron reinforcement 20 (see the rear portion 23b of the cowl side reinforcement 23) in the vehicle up-down direction, and this reinforcement member 60 is provided with the front ridge portion X1 and the rear ridge portion X2 which are continuous in the vehicle up-down direction without a break, improving rigidity of the reinforcement member 60 at each of these front and rear ridge portions X1 and X2.

Thereby, rigidity in the front-rear direction of the hinge pillar 30 overlapping with the mounting portion of the apron reinforcement 20 can be improved, and thereby when a load from the apron reinforcement 20 to the rear direction is input, bending deformation of the hinge pillar 30 in which the mounting portion of the apron reinforcement 20 serves as a starting point (bending deformation in a front opening V shape in which the vehicle front side is open) can be suppressed.

Furthermore, each of the above-described front and rear ridge portions X1 and X2 is continuous in the vehicle up-down direction without a break, and thus proof stress with respect to compression and tension in the vehicle up-down direction of the reinforcement member 60 is improved, so that the bending deformation of the hinge pillar 30 can be further suppressed.

As shown in FIG. 10, at the front flange portion 62 of the reinforcement member 60, a plurality of joined portions 62a, 62b, 62c, 62d, and 62e with respect to the front face 35a of the hinge pillar outer 35 at the hinge pillar 30 are formed so as to be spaced apart from each other in the vehicle up-down direction.

As shown in the drawing, at the lateral flange portion 63 of the reinforcement member 60, a plurality of joined portions 63a, 63b, and 63c with respect to the outer-side face 35b of the hinge pillar outer 35 at the hinge pillar 30 are formed so as to be spaced apart from each other in the vehicle up-down direction.

As shown in FIGS. 5, 6, and 7, the above-described front flange portion 62 is joined and fixed to the front face 35a of the hinge pillar outer 35 at the hinge pillar 30, at the joined portions 62a to 62e. Furthermore, the above-described lateral flange portion 63 is joined and fixed to the vehicle-width-direction outer-side face 35b of the hinge pillar outer 35 at the hinge pillar 30, at the joined portions 63a, 63b, and 63c.

As shown in FIG. 5, between a front outer corner portion at the hinge pillar outer 35 of the hinge pillar 30 and the body 61 of the reinforcement member 60, a second closed cross-section 64 extending in the vehicle up-down direction is formed. By forming this second closed cross-section 64, the above-described bending deformation of the hinge pillar 30 can be suppressed more effectively.

As shown in FIGS. 3, 5, 8, 9, and 10, at an upper portion at the body 61 of the above-described reinforcement member 60, a hole 65 passing through the body 61 is formed at a position facing to the mounting portion of the apron reinforcement 20 (see the rear portion 23b of the cowl side reinforcement 23).

The body 61 is provided with the hole 65, at the position facing to the mounting portion of the apron reinforcement 20, namely, a position overlapping with the mounting portion of the apron reinforcement 20 in the vehicle up-down direction and the vehicle front-rear direction.

Thereby, as shown in FIG. 5, via the hole 65, the joined portion 23f of an up-down-direction intermediate portion at the rear portion 23b of the cowl side reinforcement 23, which is the mounting portion of the apron reinforcement 20, and the hinge pillar outer 35 can be joined and fixed to each other. Namely, a welding gun can be inserted and separated via the above-described hole 65 so that it is possible to perform spot welding in which three pieces, the rear portion 23b of the cowl side reinforcement 23, the outer-side face 3b of the hinge pillar portion 3, and the outer-side face 35b of the hinge pillar outer 35 are superimposed on each other.

Figure 9:
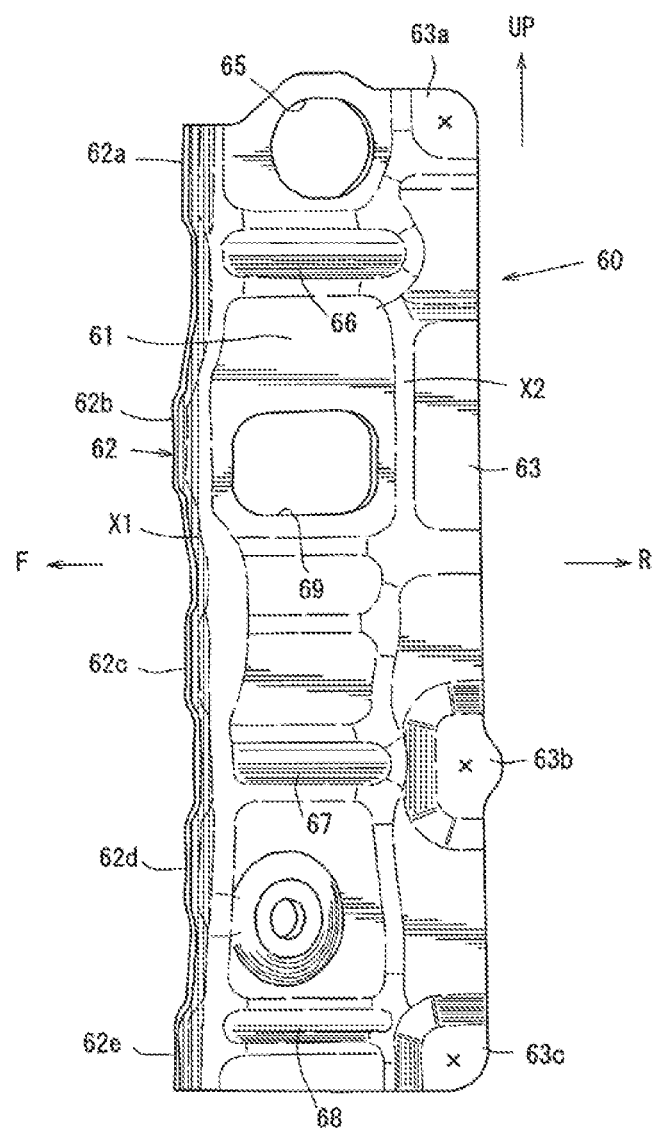
FIG. 9 is an inner side view showing the reinforcement member viewed from the vehicle-width-direction inner side.

Furthermore, as shown in FIGS. 9 and 10, the above-described hole 65 is formed in an opening manner at the body 61 at an intermediate portion between the front and rear ridge portions X1 and X2. Thereby, while the elements 23b, 3b, and 35b can be joined and fixed to each other via the hole 65, each of the ridge portions X1 and X2 of the reinforcement member 60 can be continuously formed in the vehicle up-down direction, and further, the reinforcement member 60 can be reduced in weight by the hole 65.

Figure 8:
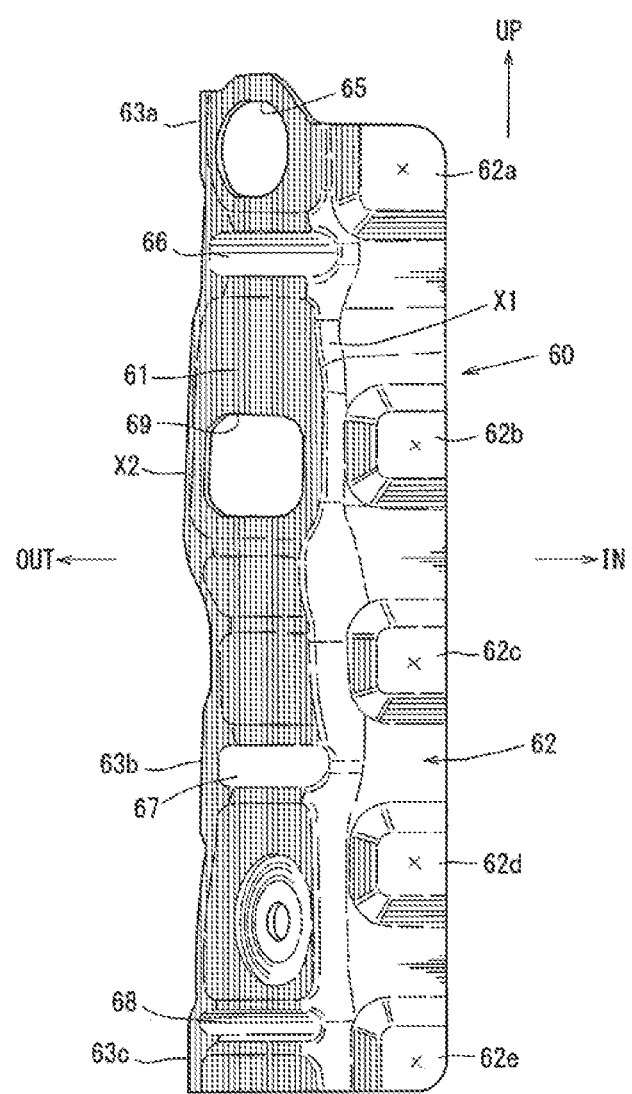
FIG. 8 is a front view showing a reinforcement member viewed from the vehicle front side.

As shown in FIGS. 8, 9, and 10, a plurality of beads 66, 67, and 68 connecting the front flange portion 62 and the lateral flange portion 63 are formed integrally with the body 61 of the above-described reinforcement member 60. The plurality of these beads 66, 67, and 68 are spaced apart from each other in the up-down direction. Each of the above-described beads 66, 67, and 68 protrudes on the closed cross-section 31 side of the hinge pillar 30 and extends in the horizontal direction so as to connect the front flange portion 62 and the lateral flange portion 63 diagonally in the front-rear direction.

Thus, by providing the above-described plurality of beads 66, 67, and 68 at the body 61 of the reinforcement member 60, at the time of receding of the apron reinforcement 20, each of these beads 66, 67, and 68 functions as a bracing portion, so that proof stress of the hinge pillar 30 with respect to input of a collision load can be improved.

As shown in FIGS. 4, 8, 9, and 10, of the above-described plurality of beads 66, 67, and 68, at least one bead, in this example, one bead 68 located on the lower side connects the joined portion 62e with respect to the hinge pillar 30 of the front flange portion 62 and the joined portion 63c with respect to the hinge pillar 30 of the lateral flange portion 63.

Thereby, a load input to the hinge pillar 30 can be effectively transferred to a lateral portion of the hinge pillar 30 to which the lateral flange portion 63 is joined, specifically, to the outer-side face 35b of the hinge pillar outer 35, via the front flange portion 62 of the reinforcement member 60, the bead 68 of the body 61, and the lateral flange portion 63, and the bending deformation of the hinge pillar 30 can be further suppressed.

As shown in FIGS. 8, 9, and 10, at the body 61 of the above-described reinforcement member 60, a hole 69 is also formed between the bead 66 on the upper side and the bead 67 intermediate in the up-down direction. This hole 69, similarly to the above-described hole 65 at the upper portion, also faces to the rear portion 23b of the cowl side reinforcement 23, and as shown in FIG. 6, via the hole 69, the joined portion 23g at a lower end portion of the rear portion 23b of the cowl side reinforcement 23 and the hinge pillar outer 35 can be joined and fixed to each other.

Furthermore, this hole 69 is formed in an opening manner at the body 61 so as to avoid each of the front and rear ridge portions X1 and X2. Thereby, while the elements 23b, 3b, and 35b can be joined and fixed to each other via the hole 69, the ridge portions X1 and X2 can be continuously formed in the up-down direction, and further, the reinforcement member 60 can be reduced in weight by the hole 69.

In this connection, when, with respect to the side frame outer 1 including the hinge pillar portion 3 in which the vehicle outer side has the cowl side reinforcement 23 disposed thereon, an assembly in which the hinge pillar outer 35, the reinforcement member 60, and a gusset member 70 are assembled is assembled and then three pieces, the cowl side reinforcement 23, the hinge pillar portion 3, and the hinge pillar outer 35 are spot welded, the holes 65 and 69 are required.

Figure 11:
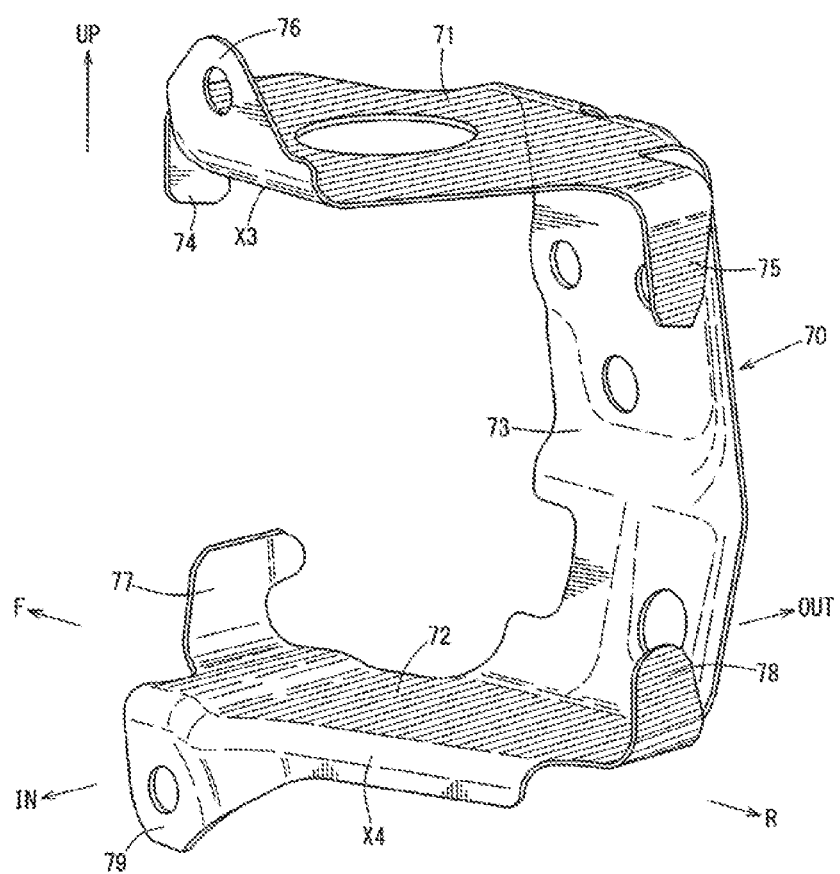
FIG. 11 is a perspective view showing a gusset member viewed from the vehicle-width-direction inner side and the vehicle rear side.
Figure 12:
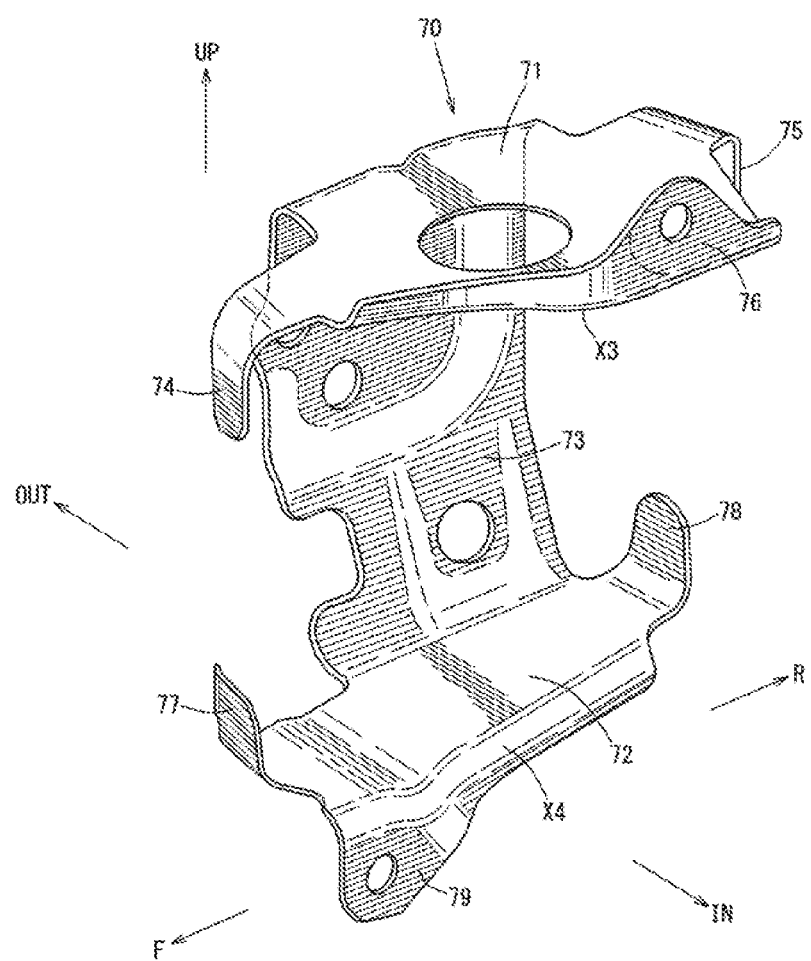
FIG. 12 is a perspective view showing the gusset member viewed from the vehicle-width-direction inner side and the vehicle front side.

FIG. 11 is a perspective view showing the gusset member 70, which will be described below, as viewed from the vehicle-width-direction inner side and the vehicle rear side, and FIG. 12 is a perspective view showing the gusset member 70 as viewed from the vehicle-width-direction inner side and the vehicle front side. As shown in FIGS. 3 and 4, the gusset member 70 is provided inside the hinge pillar 30 at a position corresponding to the mounting portion of the above-described apron reinforcement 20 (see the rear portion 23b of the cowl side reinforcement 23), and as shown in FIGS. 3 and 4, an upper portion of the above-described reinforcement member 60 is provided so as to overlap with a lower portion of the gusset member 70 in the vehicle up-down direction.

As shown in FIGS. 11 and 12, the above-described gusset member 70 includes an upper wall 71 and a lower wall 72 as partition faces partitioning the closed cross-section 31 of the hinge pillar 30 on an upper side and a lower side, and a raised wall 73 connecting the upper wall 71 and the lower wall 72 in the vehicle up-down direction.

As shown in FIGS. 11 and 12, the above-described upper wall 71 includes a front-side flange 74, a rear-side flange 75, and an inner-side flange 76. The above-described front-side flange 74 is formed so as to be bent downward from a front end of the upper wall 71. The above-described rear-side flange 75 is formed so as to be bent downward from a rear end of the upper wall 71. The above-described inner-side flange 76 is formed so as to be bent upward from a vehicle-width-direction inner end of the upper wall 71.

As shown in FIGS. 11 and 12, the above-described lower wall 72 includes a front-side flange 77, a rear-side flange 78, and an inner-side flange 79. The above-described front-side flange 77 is formed so as to be bent upward from a front end of the lower wall 72. The above-described rear-side flange 78 is formed so as to be bent upward from a rear end of the lower wall 72. The above-described inner-side flange 79 is formed so as to be bent downward from a vehicle-width-direction inner end of the lower wall 72.

As shown in FIGS. 11 and 12, on the upper side of the gusset member 70, between the vehicle-width-direction inner end of the upper wall 71 and a lower end of the inner-side flange 76, an upper ridge portion X3 extending in the front-rear direction is formed. By this upper ridge portion X3, rigidity of an upper portion of the gusset member 70 can be improved.

As shown in FIGS. 11 and 12, on the lower side of the gusset member 70, between the vehicle-width-direction inner end of the lower wall 72 and an upper end of the inner-side flange 79, a lower ridge portion X4 extending in the front-rear direction is formed. By this lower ridge portion X4, rigidity of a lower portion of the gusset member 70 can be improved.

As shown in FIGS. 3 and 4, the front-side flange 74 on the upper side of the gusset member 70 is joined and fixed to the front face 35a of the hinge pillar outer 35, and the front-side flange 77 on the lower side is joined and fixed to the front face 35a of the hinge pillar outer 35 via the front flange portion 62 of the reinforcement member 60. As also shown in FIGS. 3 and 4, each of the upper and lower rear-side flanges 75 and 78 of the gusset member 70 is joined and fixed to the rear face 35c of the hinge pillar outer 35.

As shown in FIGS. 2 and 3, the inner-side flange 76 on the upper side of the gusset member 70 is fixed to the hinge pillar inner upper 32 at the hinge pillar inner 34, and as shown in FIG. 5, the inner-side flange 79 on the lower side of the gusset member 70 is fixed to the hinge pillar inner lower 33 at the hinge pillar inner 34.

Thus, at the position corresponding to the rear portion 23b of the cowl side reinforcement 23, inside the hinge pillar 30, the gusset member 70 having the upper wall 71 and the lower wall 72 as the partition faces partitioning the closed cross-section 31 of the hinge pillar 30 on an upper side and a lower side is provided, and the reinforcement member 60 is provided so as to overlap with the gusset member 70 in the up-down direction.

Thereby, a rigidity difference of the hinge pillar 30 in the vicinity of the mounting portion of the apron reinforcement 20 (the rear portion 23b of the cowl side reinforcement 23) can be reduced, and the bending deformation of the hinge pillar 30 can be further suppressed.

Furthermore, by forming, at the above-described gusset member 70, the upper ridge portion X3 and the lower ridge portion X4 which extend in the vehicle front-rear direction, at the time of input of a collision load, the load can be effectively transferred from the front face 35a of the hinge pillar outer 35 to the rear face 35c, and sectional collapse of the closed cross-section 31 of the hinge pillar 30 can be suppressed.

Although in this embodiment, the structure on the vehicle right side is explained as the vehicle-body structure of the vehicle, the structure on the vehicle left side is configured to be left-right symmetrical to or substantially left-right symmetrical to that on the vehicle right side. Furthermore, in the drawings, arrow F indicates the vehicle front side; arrow R, the vehicle rear side; arrow IN, the inner side in the vehicle width direction; arrow OUT, the outer side in the vehicle width direction; arrow UP, the vehicle upper side.

Thus, the vehicle-body structure of the vehicle in such an embodiment is a vehicle-body structure of a vehicle which includes the pair of left and right apron reinforcements 20 extending in the front-rear direction of the vehicle so as to be located on the vehicle-width-direction outer side and the upper side with respect to the pair of left and right front side frames 10 extending in the front-rear direction of the vehicle, and the pair of left and right hinge pillars 30 each of which has the closed cross-section 31 extending in the vehicle up-down direction and on which the rear ends of the apron reinforcements 20 are mounted, and the vehicle-body structure includes the reinforcement member 60 inside the closed cross-section 31 of the hinge pillar 30 which is provided at the position overlapping with the mounting portion of the apron reinforcement 20 (see the rear portion 23b of the cowl side reinforcement 23) in the vehicle up-down direction, wherein the reinforcement member 60 includes the body 61 extending in the vehicle up-down direction so as to be spaced apart from the hinge pillar 30, the front flange portion 62 mounted on the front face of the hinge pillar 30 so as to be located at the front portion of the body 61, the lateral flange portion 63 mounted on the vehicle-width-direction outer-side face of the hinge pillar 30 so as to be located at the rear portion of the body 61, the front ridge portion X1 located between the body 61 and the front flange portion 62, and the rear ridge portion X2 located between the body 61 and the lateral flange portion 63, and each of the front ridge portion X1 and the rear ridge portion X2 is continuously provided over the reinforcement member 60 in the vehicle up-down direction (see FIGS. 1, 3, 5, and 10).

According to this configuration, the reinforcement member 60 is provided at a position overlapping with the mounting portion of the apron reinforcement 20 (the rear portion 23b of the cowl side reinforcement 23) in the up-down direction, and this reinforcement member 60 is provided with the front ridge portion X1 and the rear ridge portion X2 which are continuous in the vehicle up-down direction without a break, improving the rigidity of the reinforcement member 60 at these front and rear ridge portions X1 and X2.

Thereby, the rigidity in the front-rear direction of the hinge pillar 30 overlapping with the mounting portion of the apron reinforcement 20 can be improved. Accordingly, when a load from the apron reinforcement 20 to the rear direction is input, the bending deformation of the hinge pillar 30 in which the mounting portion of the apron reinforcement 20 serves as the starting point can be suppressed.

Furthermore, each of the front and rear ridge portions X1 and X2 is continuous in the vehicle up-down direction without a break, and thus the proof stress with respect to compression and tension in the vehicle up-down direction of the reinforcement member 60 is improved, so that the bending deformation of the hinge pillar 30 can be further suppressed. Accordingly, it is especially effective when, as in a small overlap collision, a collision load in which the apron reinforcement 20 recedes is input to the hinge pillar 30.

Furthermore, in an embodiment of the present disclosure, the front flange portion 62 is joined and fixed to the front face 35a of the hinge pillar 30 (specifically, the hinge pillar outer 35), the lateral flange portion 63 is joined and fixed to the vehicle-width-direction outer-side face 35b of the hinge pillar 30 (specifically, the hinge pillar outer 35), and between the hinge pillar 30 and the reinforcement member 60, the second closed cross-section 64 extending in the vehicle up-down direction is formed (see FIG. 5). According to this configuration, by forming the second closed cross-section 64, the bending deformation of the hinge pillar 30 can be suppressed more effectively.

Furthermore, in an embodiment of the present disclosure, at the position corresponding to the mounting portion of the apron reinforcement 20 (the rear portion 23b of the cowl side reinforcement 23), inside the hinge pillar 30, the gusset member 70 having the partition faces (the upper wall 71 and the lower wall 72) partitioning the closed cross-section 31 of the hinge pillar 30 on an upper side and a lower side is provided, and the reinforcement member 60 is provided so as to overlap with the gusset member 70 in the vehicle up-down direction (see FIGS. 3 to 5). According to this configuration, the rigidity difference of the hinge pillar 30 in the vicinity of the mounting portion of the apron reinforcement 20 (the rear portion 23b of the cowl side reinforcement 23) can be reduced, and the bending deformation of the hinge pillar 30 can be further suppressed.

Furthermore, in an embodiment of the present disclosure, the body 61 has the hole 65 at the position facing to the mounting portion of the apron reinforcement 20 (the rear portion 23b of the cowl side reinforcement 23) (see FIGS. 5 and 8 to 10). According to this configuration, while the apron reinforcement 20 and the hinge pillar 30 can be joined and fixed to each other via the above-described hole 65, each of the front and rear ridge portions X1 and X2 of the reinforcement member 60 can be continuous in the vehicle up-down direction, and further, the reinforcement member 60 can be reduced in weight by the hole 65.

Furthermore, in an embodiment of the present disclosure, the body 61 includes the plurality of beads 66, 67, and 68 connecting the front flange portion 62 and the lateral flange portion 63 and spaced apart from each other in the vehicle up-down direction (see FIGS. 8 to 10). According to this configuration, at the time of receding of the apron reinforcement 20, the plurality of beads 66, 67, and 68 can function as the brace-like bracing portions, and the proof stress of the hinge pillar 30 with respect to input of a collision load can be improved.

In addition, in an embodiment of the present disclosure, of the plurality of beads 66, 67, and 68, at least one bead 68 connects the joined portion 62e with respect to the hinge pillar 30 of the front flange portion 62 and the joined portion 63c with respect to the hinge pillar 30 of the lateral flange portion 63 (see FIGS. 3, 4, 9, and 10). According to this configuration, a load input to the hinge pillar 30 can be effectively transferred to the lateral portion of the hinge pillar 30 to which the lateral flange portion 63 is joined, via the front flange portion 62 of the reinforcement member 60, the bead 68 of the body 61, and the lateral flange portion 63, and the bending deformation of the hinge pillar 30 can be further suppressed.

Although in a correspondence between the configuration of the present disclosure and the above-described embodiment, the mounting portion of the apron reinforcement 20 in the present disclosure corresponds to the rear portion 23b of the cowl side reinforcement 23 in the above-described embodiment. Hereinafter, similarly, the partition faces of the gusset member 70 correspond to the upper wall 71 and the lower wall 72, the front face of the hinge pillar 30 corresponds to the front face 35a of the hinge pillar outer 35, and the vehicle-width-direction outer-side face of the hinge pillar 30 corresponds to the outer-side face 35b of the hinge pillar outer 35. However, the present disclosure is not limited to only the configuration of the above-described embodiment.

For example, although in such an embodiment, a structure is adopted in which only the bead 68 on the lower side connects the joined portions 62e and 63c, instead of this, a structure may be adopted in which all the beads 66, 67, and 68 connect the joined portion with respect to the hinge pillar 30 of the front flange portion 62 and the joined portion with respect to the hinge pillar 30 of the lateral flange portion 63.

As explained above, the present disclosure is useful for a vehicle-body structure of a vehicle which includes a pair of left and right apron reinforcements extending in the front-rear direction of the vehicle so as to be located on the vehicle-width-direction outer side and the upper side with respect to a pair of left and right front side frames extending in the front-rear direction of the vehicle, and a pair of left and right hinge pillars each of which has a closed cross-section extending in the vehicle up-down direction and on which rear ends of the apron reinforcements are mounted.

What is claimed is:

1. A vehicle-body structure of a vehicle, comprising:
a pair of left and right apron reinforcements extending in a front-rear direction of the vehicle so as to be located on a vehicle-width-direction outer side and an upper side with respect to a pair of left and right front side frames extending in the front-rear direction of the vehicle; and
a pair of left and right hinge pillars each of which has a closed cross-section extending in a vehicle up-down direction and on which rear ends of the apron reinforcements are mounted, wherein
a) the vehicle-body structure comprises a reinforcement member inside the closed cross-section of each of the hinge pillars, the reinforcement member being provided at a position overlapping with a mounting portion of the respective apron reinforcement in the vehicle up-down direction,
b) the reinforcement member comprises:
a body extending in the vehicle up-down direction so as to be spaced apart from the hinge pillar;
a front flange portion mounted on a front face of the hinge pillar so as to be located at a front portion of the body;
a lateral flange portion mounted on a vehicle-width-direction outer-side face of the hinge pillar so as to be located at a rear portion of the body;
a front ridge portion located between the body and the front flange portion; and
a rear ridge portion located between the body and the lateral flange portion,
c) each of the front ridge portion and the rear ridge portion is continuously provided over the reinforcement member in the vehicle up-down direction, and
d) an upper end of the reinforcement member is located above a joined portion at a lower end portion of the mounting portion of the respective apron reinforcement, and a lower end portion of the reinforcement member is located below the joined portion.

2. The vehicle-body structure of the vehicle according to claim 1, wherein
the front flange portion is joined and fixed to the front face of the hinge pillar,
the lateral flange portion is joined and fixed to the vehicle-width-direction outer-side face of the hinge pillar, and
between the hinge pillar and the reinforcement member, a second closed cross-section extending in the vehicle up-down direction is formed.

3. The vehicle-body structure of the vehicle according to claim 2, wherein
at a position corresponding to the mounting portion of the apron reinforcement, inside each of the hinge pillars, a gusset member having partition faces partitioning the closed cross-section of the hinge pillar on an upper side and a lower side is provided, and
the reinforcement member is provided so as to overlap with the gusset member in the vehicle up-down direction.

4. The vehicle-body structure of the vehicle according to claim 3, wherein
the body has a hole at a position facing to the mounting portion of each of the apron reinforcements.

5. The vehicle-body structure of the vehicle according to claim 4, wherein
the body includes a plurality of beads connecting the front flange portion and the lateral flange portion and spaced apart from each other in the vehicle up-down direction.

6. The vehicle-body structure of the vehicle according to claim 5, wherein
of the plurality of beads, at least one bead connects a joined portion with respect to the hinge pillar of the front flange portion and a joined portion with respect to the hinge pillar of the lateral flange portion.

7. The vehicle-body structure of the vehicle according to claim 1, wherein
at a position corresponding to the mounting portion of the apron reinforcement, inside each of the hinge pillars, a gusset member having partition faces partitioning the closed cross-section of the hinge pillar on an upper side and a lower side is provided, and
the reinforcement member is provided so as to overlap with the gusset member in the vehicle up-down direction.

8. The vehicle-body structure of the vehicle according to claim 1, wherein
the body has a hole at a position facing to the mounting portion of each of the apron reinforcements.

9. The vehicle-body structure of the vehicle according to claim 1, wherein
the body includes a plurality of beads connecting the front flange portion and the lateral flange portion and spaced apart from each other in the vehicle up-down direction.

10. The vehicle-body structure of the vehicle according to claim 2, wherein
the body has a hole at a position facing to the mounting portion of each of the apron reinforcements.

11. The vehicle-body structure of the vehicle according to claim 2, wherein
the body includes a plurality of beads connecting the front flange portion and the lateral flange portion and spaced apart from each other in the vehicle up-down direction.

12. The vehicle-body structure of the vehicle according to claim 7, wherein
the body has a hole at a position facing to the mounting portion of the apron reinforcement.

13. The vehicle-body structure of the vehicle according to claim 7, wherein
the body includes a plurality of beads connecting the front flange portion and the lateral flange portion and spaced apart from each other in the vehicle up-down direction.

14. The vehicle-body structure of the vehicle according to claim 8, wherein the body includes a plurality of beads connecting the front flange portion and the lateral flange portion and spaced apart from each other in the vehicle up-down direction.

15. The vehicle-body structure of the vehicle according to claim 9, wherein
of the plurality of beads, at least one bead connects a joined portion with respect to the hinge pillar of the front flange portion and a joined portion with respect to the hinge pillar of the lateral flange portion.

16. The vehicle-body structure of the vehicle according to claim 10, wherein
the body includes a plurality of beads connecting the front flange portion and the lateral flange portion and spaced apart from each other in the vehicle up-down direction.

17. The vehicle-body structure of the vehicle according to claim 11, wherein
of the plurality of beads, at least one bead connects a joined portion with respect to the hinge pillar of the front flange portion and a joined portion with respect to the hinge pillar of the lateral flange portion.

18. The vehicle-body structure of the vehicle according to claim 12, wherein
the body includes a plurality of beads connecting the front flange portion and the lateral flange portion and spaced apart from each other in the vehicle up-down direction.

* * * * *